(12) United States Patent
Angel

(10) Patent No.: US 10,330,229 B1
(45) Date of Patent: Jun. 25, 2019

(54) SEWER HOSE AND METHOD

(71) Applicant: CAMCO MANUFACTURING, INC., Greensboro, NC (US)

(72) Inventor: Bruce A. Angel, Stokesdale, NC (US)

(73) Assignee: CAMCO MANUFACTURING, INC., Greensboro, NC (US)

(*) Notice: Subject to any disclaimer, the term of this patent is extended or adjusted under 35 U.S.C. 154(b) by 307 days.

(21) Appl. No.: 15/200,487

(22) Filed: Jul. 1, 2016

(51) Int. Cl.
*F16L 11/11* (2006.01)
*F16L 25/00* (2006.01)

(52) U.S. Cl.
CPC ......... *F16L 25/0045* (2013.01); *F16L 11/11* (2013.01)

(58) Field of Classification Search
CPC ........ B21D 15/06; B21D 15/10; B29C 59/02; B29C 59/021; B29C 59/04; B29C 47/126; F16L 11/11; F16L 25/0045
See application file for complete search history.

(56) References Cited

U.S. PATENT DOCUMENTS

| | | | | |
|---|---|---|---|---|
| 3,784,346 A * | 1/1974 | Maroschak | ........... | B29C 33/306 425/532 |
| 3,859,025 A * | 1/1975 | Maroschak | ......... | B29C 49/0021 425/326.1 |
| 3,891,733 A * | 6/1975 | Maroschak | ......... | B29C 49/0021 264/150 |
| 3,897,090 A * | 7/1975 | Maroschak | ......... | F16L 25/0045 138/121 |
| 4,509,911 A * | 4/1985 | Rosenbaum | ........ | F16L 37/0985 264/508 |
| 5,330,699 A * | 7/1994 | Shetler | ...................... | A47L 9/24 264/132 |
| 5,476,630 A * | 12/1995 | Orsing | ................. | A61C 17/043 264/150 |
| 6,764,627 B2 * | 7/2004 | D'Angelo | ............. | B29C 47/126 264/150 |
| 7,926,510 B1 * | 4/2011 | Terry, III | ................ | E03F 11/00 137/363 |
| 9,341,289 B1 * | 5/2016 | Maroschak | ............ | F16L 11/118 |

* cited by examiner

Primary Examiner — Edward T Tolan
(74) Attorney, Agent, or Firm — Tuggle Duggins P.A.; Blake Hurt

(57) ABSTRACT

A sewer hose including a corrugated central body integrally joined at opposing longitudinal ends by attachment collars, a first collar defining one or more locking channels, and a second collar defining one or more lugs sized and shaped for insertion into respective channels. A method of manufacturing the hose is also disclosed, including the steps of providing mold segments sized and shaped to produce the aforementioned collar sections as well as the corrugated central body, deploying them in a molding apparatus, and injecting a polymeric material into the mold segments so as to form a sewer hose with integrally attached male and female attachment collars, negating inefficient and ineffective attachment adapters.

7 Claims, 5 Drawing Sheets

SEWER HOSE AND METHOD

FIELD OF THE INVENTION

The invention herein pertains to a waste hose and particularly pertains to a polymeric corrugated hose adapted with integral collars defining lug and channel style fittings, including a method of manufacturing the same.

DESCRIPTION OF THE PRIOR ART AND OBJECTIVES OF THE INVENTION

The use of polymeric hoses to transport materials, including waste materials such as waste water and sewage from recreational vehicles and trailers is known in the art. Due to the unpleasant ramifications of using these hoses for their intended purposes, including inhalation of vapors and smelling the residual stench, it is often desirable to wash these hoses after use and prior to storage, commonly in a cavity defined by the bumper of the vehicle with which the hose is used. It is also desirable to ensure that no leakage occurs when the waste materials are being transferred. To effectuate this goal, it is common to utilize fasteners or fittings at the terminal ends of the hose, frictionally fit in a male-to-female relationship, in an attempt to seal the contents of the hose inside. There are many problems with this attempted solution to confine the waste, including difficult in manufacturing and assembly, imperfect installation, increased cost, and failure of the frictional fit, even in the face of additional adhesive, fasteners, or the like.

Thus, in view of the problems and disadvantages associated with prior art hoses and associated fittings, the present invention was conceived and one of its objectives is to provide a sewer hose with integrated attachment fittings formed thereon.

It is another objective of the present invention to provide a corrugated sewer hose with integrally formed attachment fittings positioned on opposing longitudinal ends.

It is still another objective of the present invention to provide a polymeric, corrugated sewer hose for use with an RV, the hose including integrally formed lug and channel style fittings positioned on opposing longitudinal ends.

It is yet another objective of the present invention to provide a sewer hose that is efficient to manufacture, simple to use, and capable of containing waste materials therein without threat of leaks.

It is a further objective of the present invention to provide a method of forming a sewer hose as described including the step of molding opposing ends with fittings integrally formed therewith.

It is still a further objective of the present invention to provide a method of forming a sewer hose as described including the step of providing a plurality of mold segments configured for homogeneous hose production.

It is yet a further objective of the present invention to provide a method of forming a waste hose as described including the step of providing a mold with at least one pair of mold segments for integrally forming lug and channel style fittings at opposing terminal ends of a waste hose.

It is still yet a further objective of the present invention to provide a sewer hose including integrally formed lug and channel style fittings, in which the lug style fitting end of the hose is sized to fit within and capable of tight frictional engagement with the channel style fitting end of a second hose for extension purposes without the need of locking adapters.

Various other objectives and advantages of the present invention will become apparent to those skilled in the art as a more detailed description is set forth below.

SUMMARY OF THE INVENTION

The aforesaid and other objectives are realized by providing a corrugated sewer hose formed in a cylindrical configuration from a polymeric material. The sewer hose defines a longitudinally extending central body with a pair of opposing attachment collars defined at opposing terminal ends. These collars are integrally formed with the central body, such that no fluid traveling within the central body may leak out at the collar/central body joint. One collar defines a plurality of projections known as "lugs" spaced approximately symmetrically about the exterior surface. The other collar defines a plurality of locking channels spaced in corresponding position to the lugs, preferably such that the hose may be locked to a member defining a plurality of lugs with a twist to ensure that no waste flowing within the hose may escape unintentionally. A method of forming a corrugated sewer hose of the type described above includes the steps of providing a hose-forming machine equipped with a plurality of mold segments for forming the hose from a polymeric material and at least one pair of mold segments sized and shaped to integrally form lug and channel portions thereon, injecting a polymeric material into the mold segments, releasing the molded polymeric material from the mold segments, cooling the polymeric material formed in the shape of a hose, and separating the hose from the otherwise continuous length of hose.

DETAILED DESCRIPTION OF THE PREFERRED EMBODIMENT AND OPERATION OF THE INVENTION

Figure 1:
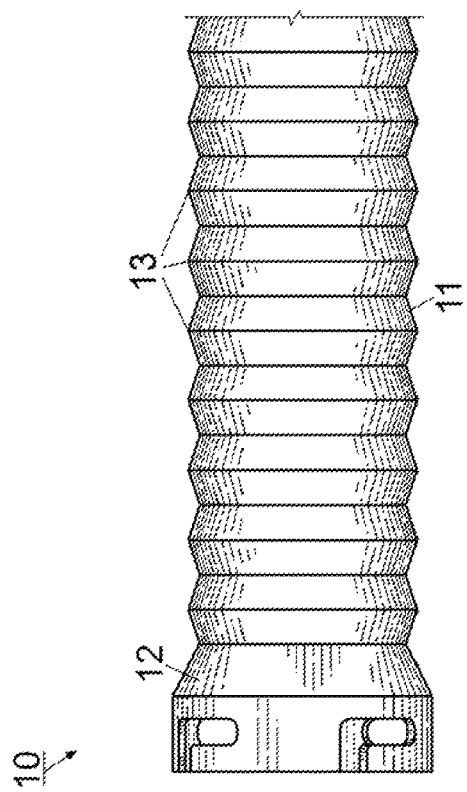
FIG. 1 shows an elevated plan side view of a sewer hose.
Figure 2:
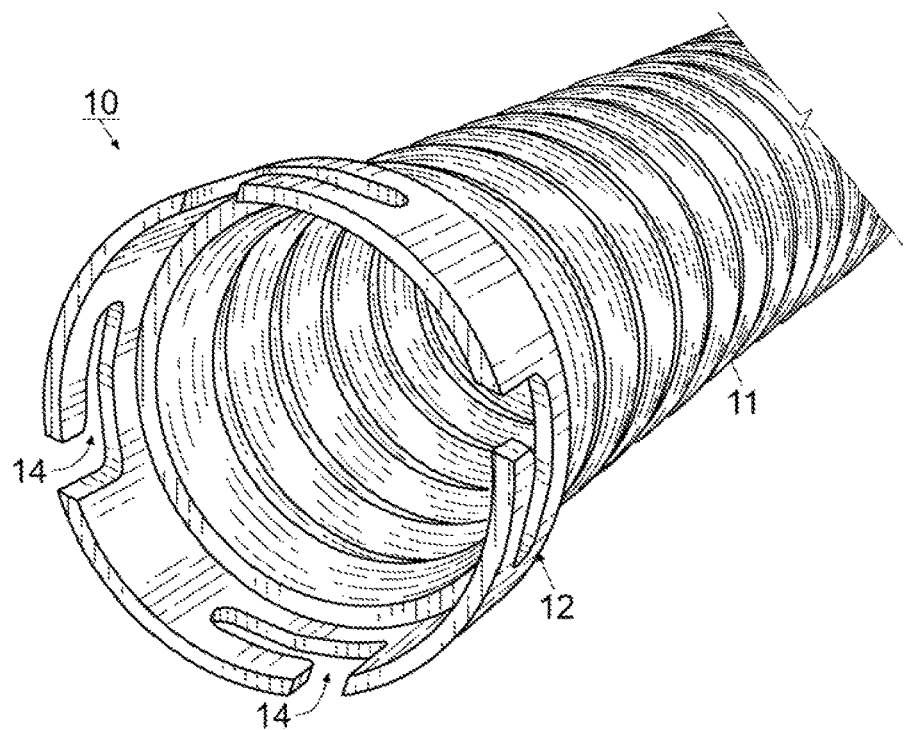
FIG. 2 pictures a side perspective view of a first end of the sewer hose of FIG. 1.
Figure 3:
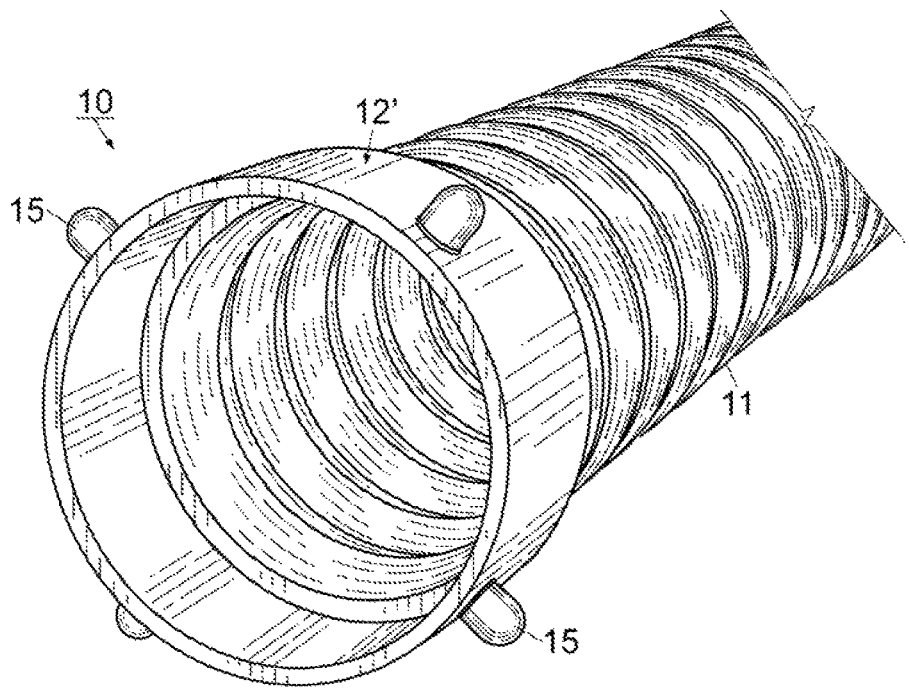
FIG. 3 depicts a side perspective view of a second end of the sewer hose of FIG. 1.

For a better understanding of the invention and its operation, turning now to the drawings, FIGS. 1-3 show various views of preferred sewer hose 10 formed from longitudinally extending central body 11 with a pair of attachment collars 12, 12' integrally defined at opposing terminal ends. As described herein, and particularly as represented in FIG. 1, it is contemplated that sewer hose 10 may be manufactured in a variety of lengths, such as eight foot (8'), ten foot (10'), and twelve foot (12') lengths, though the indeterminate length indicated in FIG. 1 should make it clear that hose length should not be construed as a limitation of the instant disclosure.

Central body 11 is a generally cylindrical hollow member that preferably defines a ribbed or corrugated exterior surface 13. Further, as partially seen in FIGS. 2 and 3, central body 11 may additionally define a constant exterior wall thickness, producing an inverted ribbed or corrugated interior surface relative to the surface defined by exterior surface 13. As will be described in further detail below, the nature of corrugated exterior surface 13 and corresponding interior surface is the byproduct of the molds used to form sewer hose 10, illustrated generally in FIG. 5. It should be noted that corrugated exterior surface 13 and interior surface should not be considered merely as a design choice, as the corrugated surfaces bestow upon sewer hose 10 increased flexibility and structural strength with respect to deformability, degradation, and bursting when compared to hoses with uniform diameter. While preferred sewer hose 10 defines the corrugated interior and exterior surfaces as described above, embodiments of sewer hose 10 are contemplated which do not define one or both surface corrugation, for example a double-walled hose with only an exterior corrugated surface or a helical hose with a uniform interior and exterior surface.

FIG. 2 pictures a side perspective view of a first end of sewer hose 10 that includes attachment collar 12 attached integrally thereto. It should be understood that relative terms like "first" and "second" ends, as well as "left" and "right" sides, are not intended to be construed as limitations on the instant disclosure, and are used for the sake of convenience. As will be described in further detail below, attachment collar 12 integrally formed to a terminal end of sewer hose 10 preferably includes at least a plurality of channels 14 configured (i.e. sized and shaped) for the reception of one or more members therein. Preferably, attachment collar 12 defines four (4) channels 14 positioned on the exterior surface and about equidistant about the circumference of attachment collar 12, for example at about ninety degree (90°) intervals, and more preferably at ninety degree (90°) intervals. Each channel 14 preferably defines an "L" shape, with the short leg of the "L" extending parallel to a longitudinal axis (not shown) defined by sewer hose 10, and the long leg of the "L" extending perpendicular about the circumference of attachment collar 12 to the same axis. This positioning and orientation of channels 14 permit the user to rotate and secure sewer hose 10 to an associated structure, for example the waste output of a recreational vehicle. By virtue of the integral attachment of attachment collar 12 to central body 11, in addition to the rotating security feature afforded in view of channels 14, sewer hose 10 can safely and securely aid in the off-boarding of waste materials without the need of adapters or the like, which are often the most common point of leaks and hose failure in the prior art. While not necessary, embodiments of sewer hose 10 may further include one or more gaskets (not shown) positioned about the inner diameter of attachment collars 12, 12' to further confirm that no material leaks from the interior to the exterior of sewer hose 10 during use.

FIG. 3 depicts a side perspective view of a second end of sewer hose 10 that includes attachment collar 12' integrally affixed thereto, located at an opposing terminal end of sewer hose 10 relative to attachment collar 12. Similar to attachment collar 12, attachment collar 12' is preferably integrally and permanently affixed to central body 11 during the manufacturing process, for example by molding the respective elements together. Attachment collar 12' defines a plurality of projections referred to herein as lugs 15 positioned or defined about the exterior surface of attachment collar 12'. Preferred attachment collar 12' defines four (4) lugs positioned on the exterior surface and about equidistant about the circumference of attachment collar 12', for example at about ninety degree (90°) intervals, and more preferably at ninety degree (90°) intervals. A structure may be considered a lug 15 if it is sized and shaped to be inserted into a corresponding channel, for example channel 14, and when rotated, serves to secure attachment collar 12' to a mounting structure with one or more channels. Correspondingly, an opening may be considered a channel 14 if it is sized and shaped to receive a lug therein, for example lug 15, and when rotated, serves to secure attachment collar 12 to a mounting structure with one or more lugs.

Figure 4:
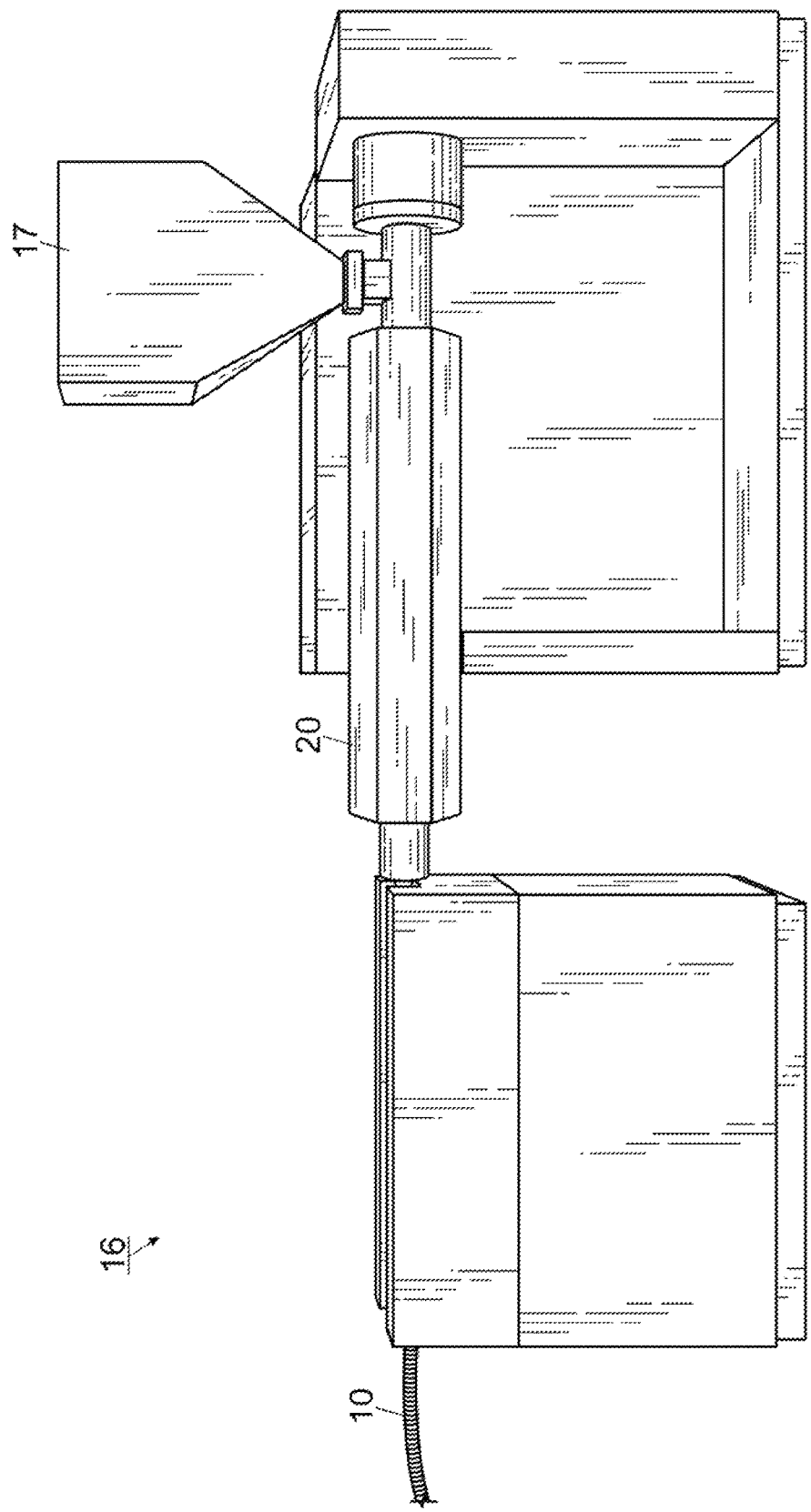
FIG. 4 demonstrates an elevated side view of a schematic representation of a mold for producing the sewer hose of FIG. 1.

A method of manufacturing, making, or otherwise forming sewer hose 10 is also provided herein. FIG. 4 demonstrates an elevated side view of an illustrative representation of mold 16 for producing sewer hose 10. While it should be understood that the structural features of example mold 16 are not intended to be limiting on the method of producing sewer hose 10, certain features are described herein to provide context that may illuminate certain elements of hose 10 and the manufacture thereof. As would be understood, a starting material (not shown) such as metal, glass, or polymer, for example a thermoplastic or thermosetting polymer, is inserted into mold 16, for example at hopper 17. The material is heated within the confines of mold 16, for example within heating barrel 20, and ejected in the cavity of one or more mold segments, such as segments 18, 18' and 19, 19'. As seen more clearly in FIG. 5, mold 16 can be outfitted with a plurality of mold segments 18, 18' that are driven in a continuous loop, and thus can continuously produce a hose of any desired length. The number of mold segments 18, 18', 19, 19' may also be varied to account for the length of hose, but hoses of conventional lengths are often produced with mold segments numbering between one and fifty (1-50) segment pairs. For the sake of brevity, mold segments 18, 18' shall not be described in detail, as segments 18, 18' are exact mirror images of each other, and all pairs of segments other than segments 19, 19' are preferably, but not necessarily, repetitive.

Figure 5:
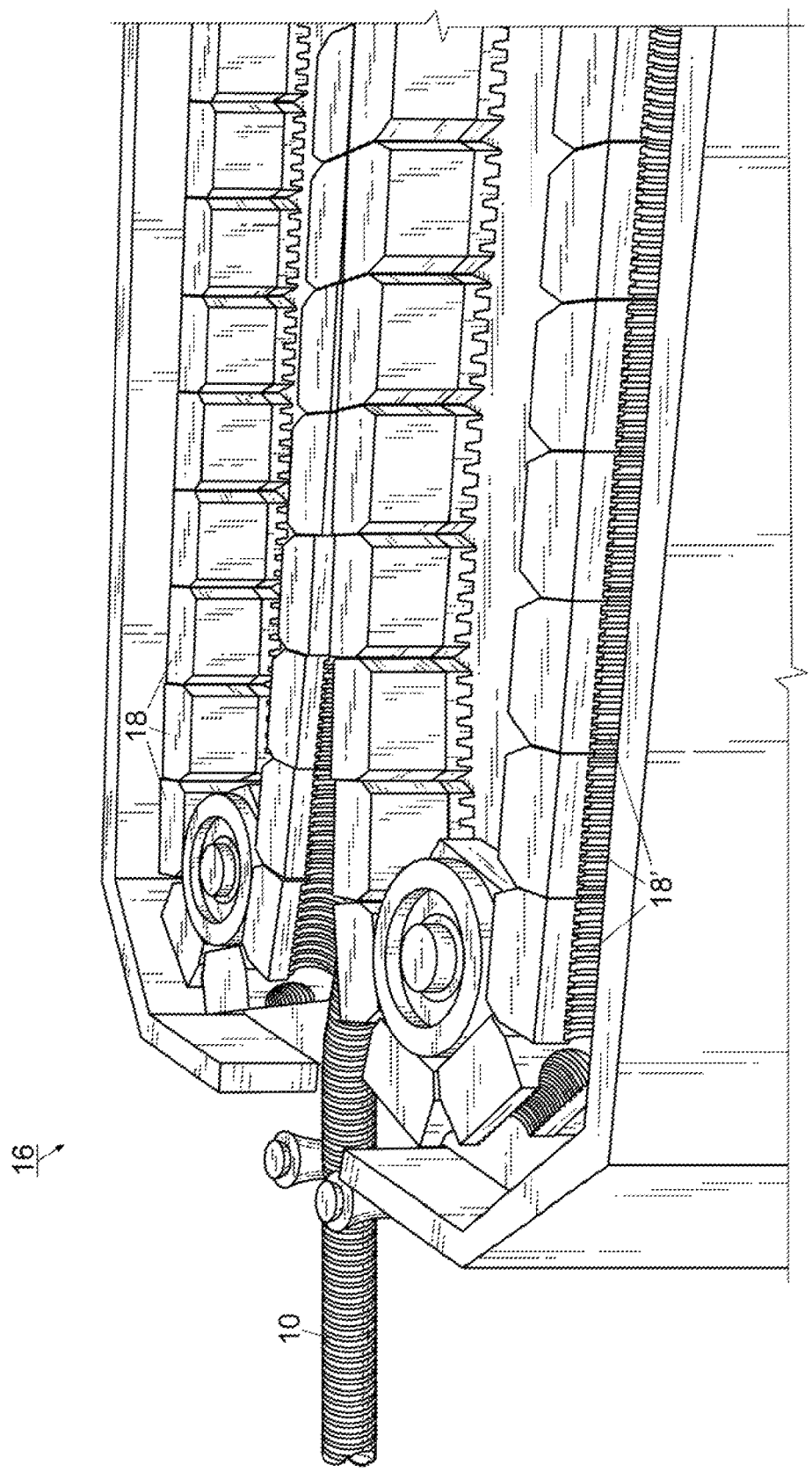
FIG. 5 illustrates a magnified and elevated side perspective view of a section of the mold of FIG. 5.
Figure 6:
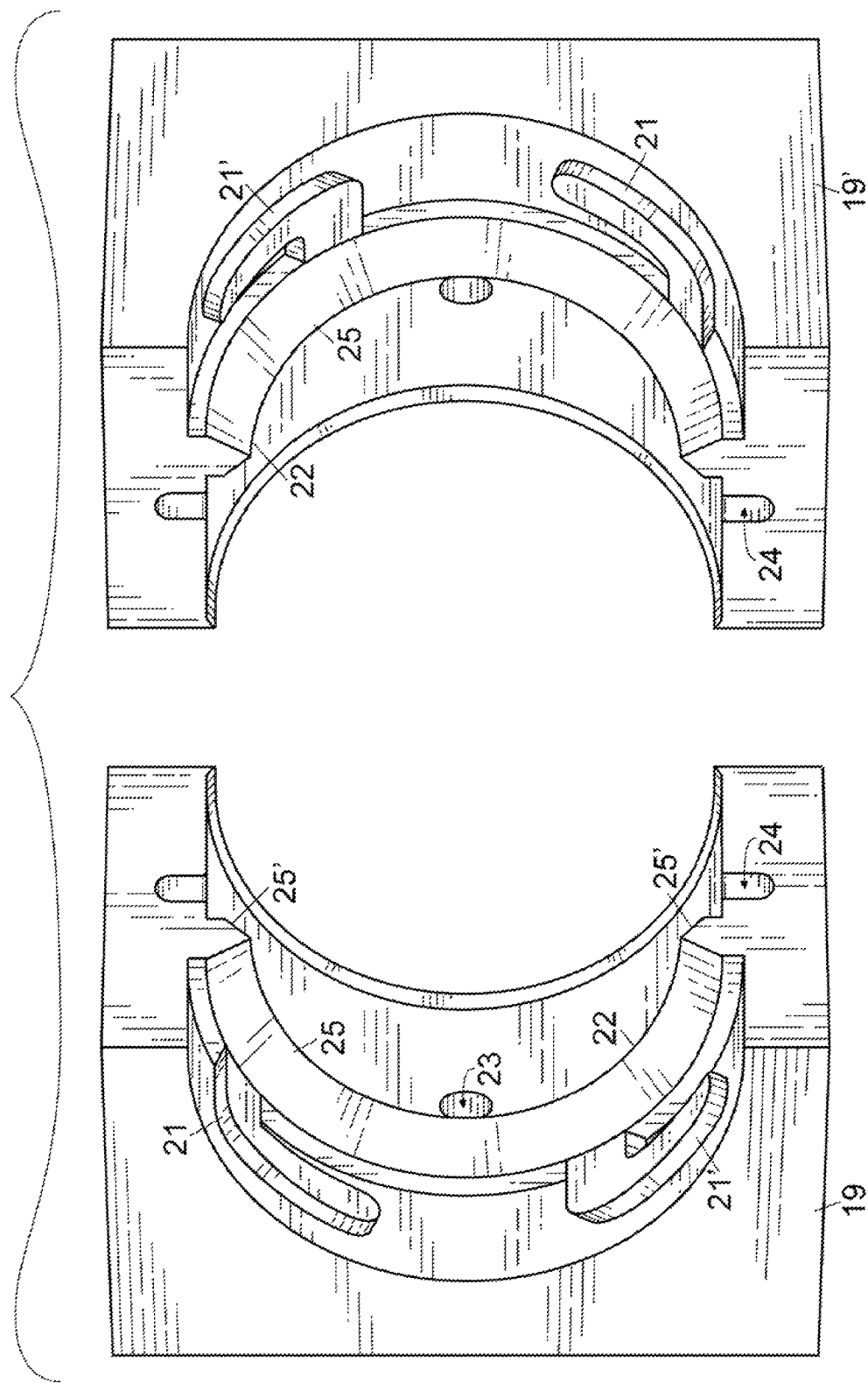
FIG. 6 features a magnified elevated perspective view of a mold segment pair utilized in forming the ends of the sewer hose of FIG. 1.

FIG. 6 features a magnified elevated perspective view of mold segments 19, 19', positioned within mold 16 and used to fabricate attachment collars 12 and 12'. Preferably, segments 19, 19' are injected with the starting material in the first position, so as to initiate the formation of sewer hose 10, with the understanding that additional central body portions would be formed and integrally attached thereto by mold segments 18, 18' as illustrated in FIG. 5. In the more proximate or first portion of segments 19, 19', one or more arcuate, L-shaped protrusions 21, 21' track the outer or exterior circumference of attachment collar 12. By deploying a fluid starting material around protrusions 21, 21', channels 14 are formed whereby the starting material fills in around said protrusions. In the more distal or second portion of segments 19, 19', each segment includes at least one hollow 23 and one or more hollow portions 24 which are oriented to extend radially outward from the exterior surface of attachment collar 12'. Preferably hollow portions 24 are longitudinally divided in half such that when cooperative portions of mold segments 19, 19' are deployed in unison a complete lug 15 results. Spine 22 is oriented between the respective first and second portions of both segments 19, 19', and acts as a barrier to allow a single mold segment pair to simultaneously form both attachment collars 12, 12', and preferably includes biased sides 25, 25' to provide the appropriate geometry indicating the separation point between the two respective collars. As would be understood collars 12, 12' may be simultaneously formed however on different hoses such that collar 12' is formed at the end of one hose as collar 12 is formed on the end of the next hose with corrugated surface 13 of central body 11 integrally formed thereafter. Once the desired length of central body 11 is reached collar 12' is then formed at the opposing end, thus repeating the formation of collars at a desired point depending on the placement of mold segments 19, 19' within the continuous loop of mold segments 18, 18' during the extrusion and production of hoses 10. The insignificant lip (not shown) formed along biased sides 25, 25' on either side of spine 22 during formation is removed when the respective ends are separated.

Once mold segments 19, 19' are infused with the appropriate starting material, subsequent mold segments 18, 18' are apportioned the appropriate amount of starting material and passed along the length of mold 16 until the mold segments 18, 18', 19, 19' are opened by virtue of the curvature of mold 16 such as seen in FIG. 5. At this point, the starting material has cooled sufficiently to assume the geometry and shape imposed by the respective mold segments, and sewer hose 10 is the outcome. Sewer hose 10 may be collected for cooling, packaging, and transportation, for example on a roll, and after segments 19, 19' complete the cycle, sewer hose 10 may be removed from mold 16, defining a desired hose length.

To allow for the extension of hose 10 by the joining of one or more hoses 10, the outer diameter of the second portion or lug collar 12' is sized to be placed and frictionally engage within the inner diameter of the first portion or lug collar 12 and thereafter rotated and locked in place by lugs 15 within channels 14 to provide a tight, leak proof seal without the need for additional components.

The purpose of this hose is to facilitate the fast and efficient connection of waste disposal systems and waste storage systems, such as the type typically found on RVs. The prior art is full of corrugated hoses, but all of them require adapters, joints, or the like which are prone to loose fitting and spillage. Therefore, the integral incorporation of both male and female attachment collars is a substantial improvement over the prior art. Additionally, or in the alternative, the method of manufacturing sewer hose 10 as describe is highly advantageous over the prior art methods, as the ability to produce varying lengths of hose, coupled with the speed and efficiency of the injection-molding process outlined herein, allow the applicant to offer sewer hose 10 at a price point previously unheard of in the industry in view of the hose performance.

The illustrations and examples provided herein are for explanatory purposes and are not intended to limit the scope of the appended claims.

I claim:

1. A method of forming a hose comprising the steps of:
providing first and second mold segment pairs, the first mold segment pair including a first portion for defining at least one, L-shaped channel, and a second portion for defining at least one lug,
inserting a starting material into the first portion of the first mold segment pair to form a first collar with the at least one, L-shaped channel formed therein,
inserting the starting material into the second mold segment pair to form a central body integrally attached to the first collar, and
inserting the starting material into a second portion of the first mold segment pair to form a second collar with the at least one lug formed on an exterior surface thereof, the first collar with the at least one, L-shaped channel and the second collar with the at least one lug integrally attached to the central body.

2. The method of claim 1 whereby the step of providing the first mold segment pair further includes providing a mold segment pair with a first portion for defining a total of four channels.

3. The method of claim 2 whereby each channel defines an L shape.

4. The method of claim 1 whereby the step of providing the first mold segment pair further includes providing a mold segment pair with a second portion for defining a total of four lugs.

5. The method of claim 1 whereby the step of providing the first mold segment pair further includes providing a mold segment pair with a spine positioned between the first portion and the second portion.

6. The method of claim 5 whereby the spine defines biased sides.

7. The method of claim 1 whereby the step of providing the first mold segment pair further includes providing a mold segment pair with the first portion having a larger diameter than the second portion.

\* \* \* \* \*